United States Patent [19]
Lee et al.

[15] 3,689,561
[45] Sept. 5, 1972

[54] PREPARATION OF ALKANE NITRO-AMINES
[72] Inventors: Richard J. Lee, Park Forest, Ill.; Robert E. Karll, Munster, Ind.
[73] Assignee: Standard Oil Company, Chicago, Ill.
[22] Filed: July 30, 1969
[21] Appl. No.: 846,248

[52] U.S. Cl...........260/583 F, 252/51.5 R, 252/390, 252/8.5 R, 252/61, 252/544, 44/72
[51] Int. Cl...............................................C07c 85/00
[58] Field of Search.........260/583 F, 583 R, 94.9 GB, 260/93.7

[56] References Cited

UNITED STATES PATENTS

| | | |
|---|---|---|
| 2,253,082 | 8/1941 | McNally et al. ....260/583 F X |
| 2,520,104 | 8/1950 | Bahner...............260/583 F X |
| 2,523,337 | 9/1950 | Bahner...............260/583 F X |
| 2,527,292 | 10/1950 | Bahner...............260/583 F X |
| 2,615,920 | 10/1952 | Bahner...............260/583 F X |
| 3,247,053 | 4/1966 | Hodge................260/583 F X |

OTHER PUBLICATIONS

Shechter et al., JACS, Vol. 81 (1959) Pages 5420–5423.
Emmons et al., JACS, Vol. 77 (1955) Pages 4387–4390.

*Primary Examiner*—Joseph Rebold
*Assistant Examiner*—Richard L. Raymond
*Attorney*—Arthur G. Gilkes, William T. McClain and Edwin C. Lehner

[57] ABSTRACT

Nitration of an alkene with dinitrogen tetroxide under oxidizing conditions forms the corresponding vicinal nitro-, nitrato-substituted alkane. Reaction of about 1-4 mols of the nitro-nitrato alkane with 1 mol of an alkylamine or alkylene polyamine forms alkane nitro-amines containing vicinal nitro-, amino-nitrogen groups. The alkane nitro-amines are useful as surfactants, rust or corrosion inhibitors, flotation agents and as additives in petroleum products.

6 Claims, No Drawings

PREPARATION OF ALKANE NITRO-AMINES

BACKGROUND OF THE INVENTION

Nitration of alkenes with dinitrogen tetra-oxide under non-oxidizing conditions forms the corresponding nitro-nitrito alkanes. Reactions of the nitro-nitrito alkanes with concentrated aqueous solutions of a basic material, such as alkylene polyamines, produce nitro-ketone alkanes.

We have discovered that, unlike the nitro-nitrito alkanes, nitro-nitrato alkanes, when treated with alkyl amines or alkylene polyamines form alkane nitro-amines.

SUMMARY OF THE INVENTION

In accordance with the present invention useful alkane nitro-amines are obtained by reacting nitro-nitrato alkanes of at least six carbon atoms with alkyl amines or with alkylene polyamines in molar proportions of from about 1 to about 4 moles of the nitro-nitrato alkane per mole of the amine or polyamine, in the presence of water at a temperature of from about 100° F. to about 140° F. After the addition of the amine, the temperature is maintained at about 100° to about 200° F. for a period of about 3 – 5 hours, while the reaction mass is agitated. The reaction product is then recovered by repeated washings with sodium bicarbonate solution, followed by water washings.

a. Preparation of the nitro-nitrato alkane

The nitro-nitrato alkane is prepared by reacting an olefin with dinitrogen tetra-oxide under oxidizing conditions, e.g., in the presence of oxygen, at a temperature of from about 32° F. to about 175° F.; the dinitrogen tetra-oxide, and the oxygenating medium, e.g., oxygen, being introduced into the reaction mass at the rate of from about 1 to about 2 cubic feet per hour. The amount of dinitrogen tetra-oxide employed is about one mole per mole of unsaturation in the olefin. The nitration of the olefin is preferably conducted in an inert solvent, e.g., an alkyl hydrocarbon solvent, such as hexane.

Any olefin containing at least one ethylenically unsaturated site can be nitrated as above described. Mono- and polyolefins, particularly those containing at least six carbon atoms, can be suitably so nitrated to the corresponding nitro-nitrato alkane. Particularly suitable olefins are polymers of $C_2$ to $C_4$ mono-olefins containing at least 20 carbon atoms, preferably from about 30 to about 200, or more, carbon atoms, and molecular weights in the range of from about 300 to about 100,000. A particularly useful class of nitro-nitrato alkanes are those prepared from polypropenes and polybutenes having average molecular weights in the range of from about 300 to about 2,500.

b. Preparation of the alkane nitro-amine

The alkane nitro-amine of the present invention is prepared by reacting from about 1 to about 4 moles of the nitro-nitrato alkane, obtained as above, with each mole of an amine or an alkylene polyamine, in the presence of water, at a temperature of from about 100° F. to about 140° F., and thereafter maintaining the reaction mass at such temperature for a period of about 3 to about 5 hours with agitation. The resultant alkane nitro-amine is recovered by repeated washings of the reaction mass with suitably an aqueous sodium bicarbonate solution, followed by water washing.

The amine reactant can be primary or secondary amines, the former being preferred. Illustrative of specific amines are methylamine, dibutylamine, cyclohexylamine, dodecylamine, octyldecylamine, methylene-amines, ethyleneamines, butyleneamines, propyleneamines, hexyleneamines, ethylene diamine, triethylene tetramine, octylmethylene diamine, tetraethylene pentamine, and other polyalkyleneamines wherein the alkylene groups contain suitably up to about 10 carbon atoms.

The alkane nitro-amines find application for many uses; the particular uses varying with the size of the alkyl group. Alkane nitro-amines having large or long chain alkyl groups which provide oil solubility are suitable as additives in oleaginous compositions to impart properties such as detergency, rust and/or corrosion inhibition, sludge inhibition, etc.; the alkane nitro-amines having intermediate and comparatively small size alkyl groups are useful as drilling mud adjuncts, surfactants, flotation agents, liquid fuel additives, etc.

PREFERRED EMBODIMENT

The following examples are illustrative of the preferred embodiments of the present invention.

Example A

Part 1. 1,720 grams of an isobutylene polymer, having an average molecular weight of about 890, was diluted with 1,000 milliliters of hexane, and the solution treated simultaneously with $N_2O_4$ gas and oxygen, at rates of 1 cubic foot per hour, at a temperature in the range of 100°–130° F. for a duration of 14.5 hours. The recovered product had a nitrogen content of 2.53 percent, and the infra-red indicated the product to be 90 percent nitro-nitrato polybutane.

Part 2. 900 grams of the nitro-nitrato polymer, obtained in Part 1, supra, was diluted with 500 milliliters of hexane, and treated dropwise with an aqueous solution of 180 grams of tetraethylene pentamine at ambient temperatures. After the addition of the amine was completed, the reaction was held at 140° F. while agitating for 3 hours. The reaction mass was then washed several times with a sodium bicarbonate solution and then washed with water. A yield of 83 percent of theory, based on pure tetraethylene pentamine, of corresponding nitro-tetraethyl pentamine was obtained.

Example B

Part 1. One mole of technical grade ($C_{18}$) alpha olefin was quantitatively converted to the corresponding nitro-nitrato alkane by the technique described in Part 1 of Example A above.

Part 2. 344 grams of the nitro-nitrato alkane obtained in Part 1 of this example, was treated with 60 grams of ethylene diamine in the manner described in Part 2 of Example A above and yielded 97 percent of the corresponding $C_{18}$ alkane nitro-amine.

Example C

Part 1. A polybutene having a molecular weight of about 1,100 was nitrated by the technique described in Part 1 of Example A above, to form the corresponding nitro-nitrato alkane.

Part 2. The nitro-nitrato alkane was converted to the corresponding nitro2amine by reacting the nitro-nitrato alkane, obtained in Part 1 above, with tetraethylene pentamine, in the ratio of 1:1, by the technique described in Part 2 of Example A above.

Example D

To a SAE 20 petroleum lubricating oil, containing 1.2 percent of a zinc dialkyldithiophosphate as an antioxidant, anti-wear additive, there was added 2% of the nitro-amine product of Example C above. The resultant lubricating oil composition was tested in the Lincoln MSV Test Sequence to evaluate the low temperature dispersancy characteristics of the nitroamine additive. Conditions for conducting the Lincoln MSV Test Sequence test, designed by the Ford Motor Company, are described in U. S. Pat. No. 3,442,808. The oil composition at the conclusion of the test was given a sludge rating of 37, demonstrating that the alkane nitro-amines prepared in accordance with this invention exhibit excellent low temperature dispersancy in lubricating oils.

The herein described alkane nitro-amines of the present invention are useable in hydrocarbon liquid fuels and in oleaginous lubricant compositions in amounts of from about 0.01 to about 10 percent; the amount used in fuel compositions usually ranges from about 0.01 to about 1.0 percent, and in lubricant compositions from about 0.1 to about 10.0 percent.

Suitable lubricating base oils are hydrocarbon oils, e.g., petroleum oils, synthetic lubricating oils such as those obtained by the polymerization of hydrocarbons, and other well-known synthetic lubricating oils.

Concentrates of a suitable oil base containing more than 10 percent, e.g., from about 15 to about 50 percent or more, of the alkane nitro-amines of the present invention alone or in combination with other additives, can be used for blending with lubricating oils in proportions desired for particular conditions or use to give a finished product containing from about 0.1 to about 10 percent of such alkane nitro-amines.

Percentages given herein and in the appended claims are weight percentages unless otherwise stated.

While particular preferred embodiments of the invention have been described, it is to be understood that the invention is not limited thereto, but includes such modifications and variations as come within the spirit and scope of the appended claims.

We Claim:

1. The method of preparing alkane nitro-amines which comprises, (A) forming a nitro-nitrato alkane by the process comprising nitrating an alkene, dissolved in an inert solvent, with dinitrogen tetraoxide in the presence of a gaseous oxidizing medium at a temperature of about 32°–175° F., and (B) reacting the resultant nitro-nitrato alkane with an amino compound selected from the class consisting of an alkyl amine and an alkylene polyamine in the presence of water, at a temperature of about 100°–140° F., said nitro-nitrato alkane being used in amounts of from about 1 mol to about 4 mols per mol of said amino compound.

2. The method of claim 1 in which the olefin hydrocarbon is a polymer of a $C_2$—$C_4$ olefin having a molecular weight of from about 300 to about 100,000.

3. The method of claim 1, in which the olefin hydrocarbon is a polypropene having a molecular weight of from about 300 to about 2,500.

4. The method of claim 1, in which the olefin hydrocarbon is a polybutene having a molecular weight of from about 300 to about 2,500.

5. The method of claim 1, in which the amino compound is tetraethylene pentamine.

6. The method of claim 1, in which the amino compound is ethylene diamine.

* * * * *